Sept. 16, 1941.  W. P. POWERS  2,256,170
PROPELLER SYNCHRONIZING AND OTHER INSTRUMENTS
Filed Jan. 24, 1941  2 Sheets-Sheet 1
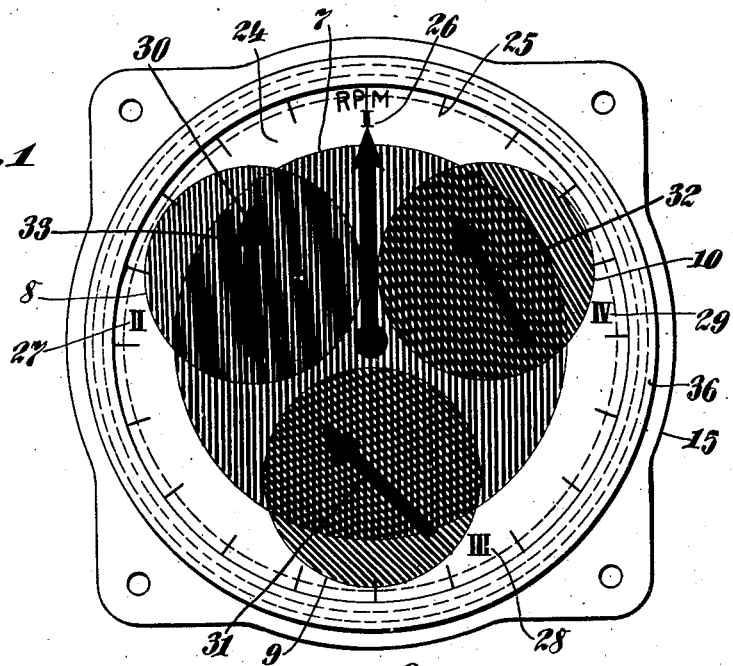
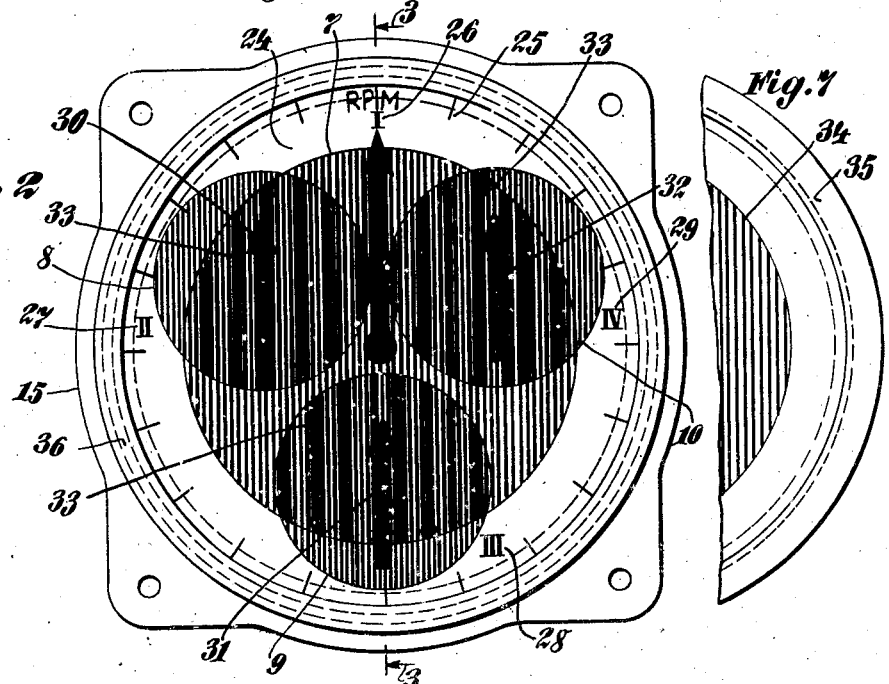
Walter P. Powers,
INVENTOR.
BY Philip S. McLean.
ATTORNEY.

Sept. 16, 1941. W. P. POWERS 2,256,170
PROPELLER SYNCHRONIZING AND OTHER INSTRUMENTS
Filed Jan. 24, 1941 2 Sheets-Sheet 2
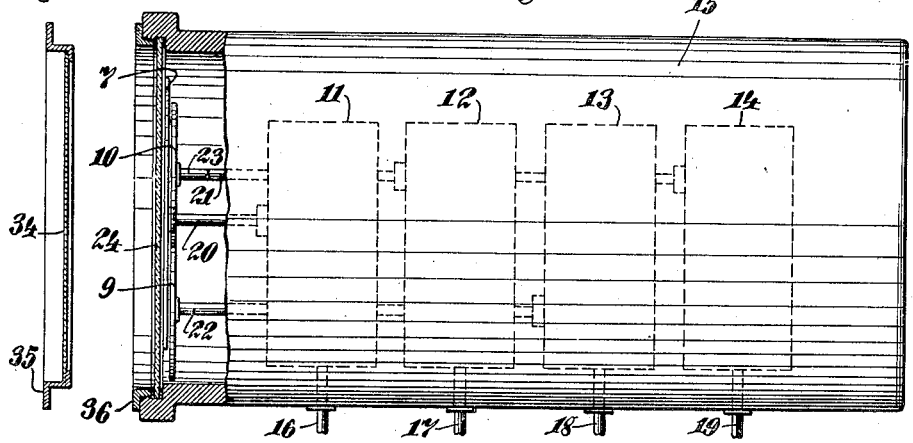
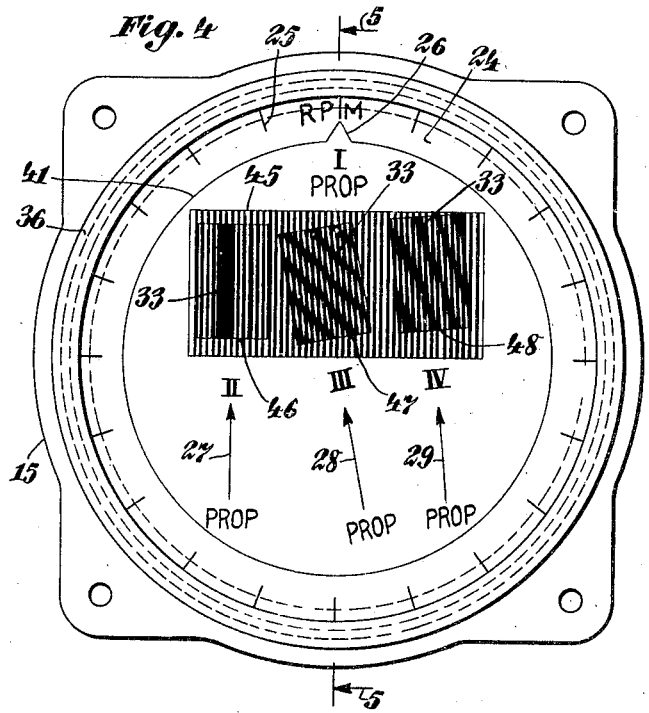
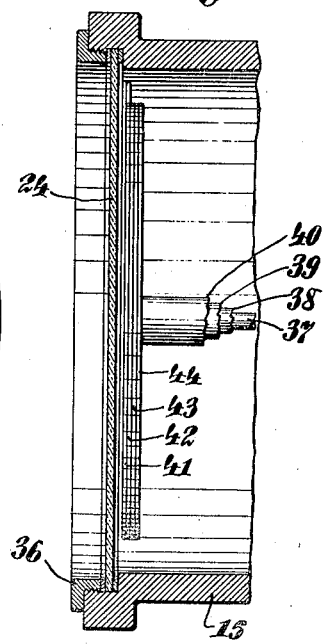
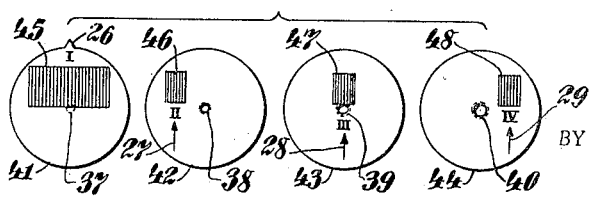
Walter P. Powers,
INVENTOR.
ATTORNEY.

Patented Sept. 16, 1941

2,256,170

UNITED STATES PATENT OFFICE 2,256,170

PROPELLER SYNCHRONIZING AND OTHER INSTRUMENTS

Walter P. Powers, East Orange, N. J., assignor to Associated Patentees, Inc., a corporation of New Jersey Application January 24, 1941, Serial No. 375,817

7 Claims. (Cl. 116—129)

The invention here disclosed relates to indicating and control devices generally and while not so restricted, is particularly adapted to such purposes as indicating and, or, controlling synchronization of motors, propellers and the like.

The objects of the invention are to provide an accurate and sensitive instrument of simple, practical design, which will magnify relatively slight variations or deviations to render them the more readily readable or controlling in effect.

Further special objects are to provide an instrument of such characteristics, particularly adapted to multi-engine aircraft for indicating relative engine or propeller speeds and for aiding in bringing the propellers into desired synchronization.

Other desirable objects and the novel features of the invention by which the objects are attained will appear and are particularly pointed out in the following specification.

The drawings accompanying and forming part of the specification illustrate different practical embodiments of the invention. The actual physical structure however may be modified and changed in many different ways, all within the true intent and broad scope of the invention as will be apparent from the following specification and the claims broadly defining the invention.

Fig. 1 is a front elevation of the invention as embodied in a four engine propeller synchronizer, illustrating conditions with the No. 1 engine brought up to speed and the No. 2 engine brought up close to synchronization, while the No. 3 and No. 4 engines may be simply idling.

Fig. 2 is a similar view, illustrating appearance of the instrument with all four propellers synchronized.

Fig. 3 is a side elevation of the instrument, broken away at the front and shown in section to illustrate details of construction.

Fig. 4 is a face view of another form of the propeller synchronizer.

Fig. 5 is a broken sectional view as on substantially the plane of line 5—5 of Fig. 4.

Fig. 6 is a view showing the first propeller indicator disc with main indicator grid and the other three discs with grids to match the first or main grid.

Figs. 7 and 8 are broken, sectional views of a standard or reference grid.

In the four engine type of synchronizer shown in Figs. 1, 2 and 3, a main, parallel line circular grid 7, is positioned by the No. 1 or other engine used as the standard and smaller circular grids 8, 9, 10, placed in front of or behind the main grid and lined in vernier relation are positioned individually according to speeds of the other three engines.

Details of the speed responsive mechanism are not shown, since ordinary tachometers, revolution counters or the like, may be employed. Thus in Fig. 3, the elements indicated at 11, 12, 13, 14, within the case 15, may be considered as tachometers driven through shafting 16, 17, 18, 19, from the No. 1, No. 2, No. 3 and No. 4 engines and operating respectively the centrally disposed shaft 20, carrying the main grid and the shafts 21, 22 and 23, grouped about the main shaft and carrying the three smaller grids 8, 9, 10.

The front of the instrument case is shown closed by a transparent cover 24, carrying an engine or propeller revolutions scale 25, for the pointer 26, of the main grid, at the center and parallel with the lines of that grid. This transparent cover is also shown as carrying designations 27, 28, 29, for the other engines or propellers in positions associated with the grids of those other power devices.

The grids 8, 9, 10, to be synchronized with the main grid also are shown as having arrows or pointers 30, 31, 32, centrally disposed and parallel with the lines of such grids.

In ordinary use, the No. 1 engine, or whichever engine is to be used as the standard, is brought up to speed, as by throttle adjustment or in the case of variable pitch propeller blades, by adjustment of blade angle to effect desired loading of the engine. This situation is visualized in Figs. 1 and 2, with the arrow of the main grid pointing to the top center of the R. P. M. scale. With the desired engine loading and propeller speed for the No. 1 or standard power unit effected, the next power unit such as the No. 2 engine and propeller combination is brought up to speed. The arrows of the smaller scales may be viewed as indicating approximate speeds or speeds relative to the first power unit and hence are of aid in bringing later units up to speed of the first unit. As the critical state of synchronization is approached, the parallel lines of the smaller grid, because of their vernier relation to the lines of the larger main grid will create the effect of a dark bar or bars 33, having angular movement of much greater extent than the angular movement creating the same. Hence the pattern forming the indicator bar or bars 33, will swing through a relatively large angle for a comparatively small angular movement of the grid itself. As a consequence, the instrument is most sensitive and becomes the more sensitive as actual synchronization is approached. Very fine adjustments can therefore be easily made. These dark pattern bars are easily read and because of their greater angular movement show up smaller variations than can be detected by comparison with the main indicator pointer. Thus in the case indicated in Fig. 1, the pointer of the second propeller grid indicates what appears to be synchronous relation to the first engine, whereas the black pattern bars show that the second propeller has not quite been brought up to actual synchronization.

In Fig. 1, the indicator discs 9 and 10, by their arrows 31 and 32, and the out of register relation with the main indicator disc, show the No. 3 and No. 4 engines, for instance, to be idling or at rest. These engines can be brought up to synchronous speed, in the same way as described with respect to the No. 2 engine, the pointers 31, 32 aiding in effecting coarse adjustments and the magnified or exaggerated indications provided by the vernier bars enabling the finer adjustments to be quickly and accurately made.

In the fully synchronized condition of all four engines, the instrument may appear as in Fig. 2, with the dark bars or shadow patterns all parallel.

In this particular situation, with the main grid at top center on the R. P. M. dial, the lines of the grids and the vernier shadows created by them all stand vertical, but it will be realized that for other adjustments of the main grid, that is, angled to one side or the other, the smaller grids and the vernier shadows created by the combinations of grids will all be correspondingly inclined when synchronous conditions are established.

The vernier relation of the cooperating grids provides indicator bars 33, which are solid black and of considerable width, making them easy to read at a distance from the instrument and by one or more persons viewing the instrument either directly in front or from various angles. These bars furthermore, are the full extent of the overlapping portions of companion grids and this factor, together with the wide angle of travel for comparatively slight grid movements, contributes greatly to the ease of reading, accuracy of adjustments and the like.

Means may be provided for making compensating adjustments, if required, to assure the grids coming into registered relation when the power devices are fully synchronized.

In cases where it is desired to hold a particular speed, an additional standardizing grid may be placed over the No. 1 grid, lined in vernier relation to that grid, so as to provide a guide or indicating pattern for that selected speed. Such a standardizing grid, is indicated at 34, Figs. 7 and 8, carried by a ring 35, which can be frictionally engaged over the rim or annular shoulder 36, on the front of the instrument and there adjusted to position for the speed which it is desired to maintain. Any variation from such speed will then show up at once by angular shifting movement of the indicator bar created by proximity of this standardizing grid over the No. 1 grid. This superposed reference grid, if as large as the No. 1 grid, cooperates with the latter to form indicator bars extending continuously all the way across the No. 1 grid, and these may cooperate with the indicator bars produced through cooperation of the No. 1 with the No. 2, 3 and 4 grids, to reinforce and accentuate the latter. With this superposed reference grid, any variations in speed in any one of the four engines will instantly show by shifting of the indicator bar for any such engine.

The instrument may be illuminated in various ways, for instance, by a lamp within the instrument case, back of the grids, or by indirect, edge or front lighting.

In the second form of the propeller synchronizer illustrated, Figs. 4, 5 and 6, the shafts set by the four engine tachometers are concentrically disposed as indicated at 37, 38, 39, 40, Fig. 5, and carry respectively, the concentric grid discs 41, 42, 43, 44, the first disc having a wide or laterally extending grid 45 and the No. 2, 3 and 4 discs having narrower grids 46, 47, 48, positioned to register with different portions of the main grid.

With this special arrangement, the indications for all engines may be read in a single row.

In the particular case illustrated in Fig. 4, the single heavy bar at the left, formed by cooperation of the No. 2 engine, grid 46, with the No. 1 main grid, shows that the No. 2 propeller is synchronized with No. 1 and the relatively inclined series of bars produced by cooperation of grids 47 and 48, with the main grid 45, show that the No. 3 and No. 4 propellers are below speed, the No. 3 to a greater extent than No. 4.

Instead of being simply utilized as a pointer for indicating purposes, the solid black bar produced by cooperation of the vernier grids may be used for control purposes, such as to cut off or vary a beam of light, and the like. The invention and various features of the invention are applicable to many other purposes than the one illustrated and are to be so understood.

In selecting and arranging the cooperating grids, the one of finer pitch, that is, with the closer spacing of lines or bars should be connected with the moving part if it is intended that the pattern or indicating bar shall travel in the same direction of movement. Conversely, reverse travel of the indicator pattern can be effected by connecting the coarser pitch grid with the moving part.

In using a standardizing grid such as indicated at 34, Figs. 7 and 8, it may be considered most desirable to have such grid of a size to cover only a portion of the No. 1 grid, such as that part at the top in Fig. 2, between the side grids 8 and 10, so that such standardizing grid will be cooperative only with the main grid and will have no effect on or cooperation with the other grids.

What is claimed is:

1. In an instrument of the character disclosed, the combination of superposed main and supplemental grids composed of parallel lines in vernier relation to cooperatively produce a shadow bar extending across the field of overlap of the superposed grids, said grids being mounted for relative rotational adjustments of one in respect to the other, there being a plurality of said supplemental grids in superposed relation to said main grid and each being rotationally adjustable independently of said main grid, said main grid being of a width to collectively cooperate with all the supplemental grids, the latter individually being of less width and positioned to stand in a single row when cooperatively related to said main grid.

2. In an instrument of the character disclosed, the combination of superposed main and supplemental grids composed of parallel lines in vernier relation to cooperatively produce a shadow bar extending across the field of overlap of the superposed grids, said grids being mounted for relative rotational adjustments of one in respect to the other, a standard grid in adjustable superposed relation to said main grid, said main grid being of larger size than the supplemental grid and said standard grid being of a size and position to cooperate only with that portion of the larger main grid not covered by the supplemental grid and not to cooperate with the smaller supplemental grid.

3. A multiple engine propeller synchronizer, comprising a flat main grid of spaced substantially parallel lines mounted for pivotal movement on an axis substantially at right angles to the plane of said grid, an engine driven speed responsive device for rotationally positioning said main grid, other individual engine speed responsive flat grids pivotally mounted in overlying substantially parallel relation to said main grid and composed of spaced substantially parallel lines in vernier relation to the lines of said main grid to cooperatively form with said main grid indicator bars extending the full extent of superposition of said other and main grid lines and engine speed responsive devices for individually rotationally positioning said other grids in respect to said main grid.

4. A multiple engine propeller synchronizer, comprising a flat main grid of spaced substantially parallel lines mounted for pivotal movement on an axis substantially at right angles to the plane of said grid, an engine driven speed responsive device for rotationally positioning said main grid, other individual engine speed responsive flat grids pivotally mounted in overlying substantially parallel relation to said main grid and composed of spaced substantially parallel lines in vernier relation to the lines of said main grid to cooperatively form with said main grid indicator bars extending the full extent of superposition of said other and main grid lines and engine speed responsive devices for individually rotationally positioning said other grids in respect to said main grid, said other grids being smaller than said main grid and arranged clear of each other and in overlying relation only to said main grid.

5. A multiple engine propeller synchronizer, comprising a flat main grid of spaced substantially parallel lines mounted for pivotal movement on an axis substantially at right angles to the plane of said grid, an engine driven speed responsive device for rotationally positioning said main grid, other individual engine speed responsive flat grids pivotally mounted in overlying substantially parallel relation to said main grid and composed of spaced substantially parallel lines in vernier relation to the lines of said main grid to cooperatively form with said main grid indicator bars extending the full extent of superposition of said other and main grid lines and engine speed responsive devices for individually rotationally positioning said other grids in respect to said main grid, the pivotal axes of said other grids being disposed about and in substantially parallel relation with the pivotal axes of said main grid.

6. A multiple engine propeller synchronizer, comprising a flat main grid of spaced substantially parallel lines mounted for pivotal movement on an axis substantially at right angles to the plane of said grid, an engine driven speed responsive device for rotationally positioning said main grid, other individual engine speed responsive flat grids pivotally mounted in overlying substantially parallel relation to said main grid and composed of spaced substantially parallel lines in vernier relation to the lines of said main grid to cooperatively form with said main grid indicator bars extending the full extent of superposition of said other and main grid lines and engine speed responsive devices for individually rotationally positioning said other grids in respect to said main grid, said main and said cooperating other grids being all concentrically mounted on the same pivotal axis.

7. A multiple engine propeller synchronizer, comprising a flat main grid of spaced substantially parallel lines mounted for pivotal movement on an axis substantially at right angles to the plane of said grid, an engine driven speed responsive device for rotationally positioning said main grid, other individual engine speed responsive flat grids pivotally mounted in overlying substantially parallel relation to said main grid and composed of spaced substantially parallel lines in vernier relation to the lines of said main grid to cooperatively form with said main grid indicator bars extending the full extent of superposition of said other and main grid lines, engine speed responsive devices for individually rotationally positioning said other grids in respect to said main grid and a standard grid of spaced substantially parallel lines in vernier relation over said main grid and adjustable angularly about the same axis as said main grid to positions of different engine speeds and cooperative with said main grid to form heavy indicating bars extending across the combined field of said main and standard grids to show when said main grid is at desired engine speed indicating position .

WALTER P. POWERS.